(12) United States Patent
Vallance

(10) Patent No.: US 6,276,868 B1
(45) Date of Patent: *Aug. 21, 2001

(54) JOINT FORMING DEVICE

(75) Inventor: William Ernest Taylor Vallance, Buckinghamshire (GB)

(73) Assignee: Titus International PLC, Buckinghamshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/308,138

(22) PCT Filed: Mar. 5, 1998

(86) PCT No.: PCT/GB98/00723

§ 371 Date: May 14, 1999

§ 102(e) Date: May 14, 1999

(87) PCT Pub. No.: WO98/40634

PCT Pub. Date: Sep. 17, 1998

(30) Foreign Application Priority Data

Mar. 11, 1997 (GB) .................................................. 9704985
May 1, 1997 (GB) .................................................. 9708955

(51) Int. Cl.[7] ..................................................... F16B 12/10
(52) U.S. Cl. ....................................... 403/409.1; 403/231
(58) Field of Search .............................. 403/409.1, 231, 403/230, 245, DIG. 8, 297

(56) References Cited

U.S. PATENT DOCUMENTS

| | | | | |
|---|---|---|---|---|
| 4,131,376 | * | 12/1978 | Busse | 403/231 X |
| 5,284,401 | * | 2/1994 | Harley | 403/409.1 |
| 5,567,081 | | 10/1996 | Vallance | 403/406.1 |
| 5,676,487 | * | 10/1997 | Lautenschlager et al. | 403/231 |
| 5,772,353 | * | 6/1998 | Grieser et al. | 403/231 |
| 5,788,395 | * | 8/1998 | Grieser et al. | 403/231 |
| 5,823,700 | * | 10/1998 | Poworoznck | 403/245 |
| 5,906,453 | * | 5/1999 | Grieser et al. | 403/409.1 |
| 6,142,700 | * | 11/2000 | Grieser et al. | 403/297 X |

* cited by examiner

Primary Examiner—Harry C. Kim
(74) Attorney, Agent, or Firm—Fitzpatrick, Cella, Harper & Scinto

(57) ABSTRACT

A cam and expandable dowel type device is provided for joining together two members, e.g., furniture components. The cam is rotatably mounted in a first of the members and designed to engage a head portion of the sleeved dowel protruding from the second member. Rotation of the cam displaces the dowel relative to the sleeve, causing the end of the sleeve to expand and thus anchor the sleeved dowel in the second member. Further rotation of the cam causes the two members to be drawn tightly together. The sleeve is designed to be partially collapsible over its length in order to provide an improved tightening action.

26 Claims, 7 Drawing Sheets

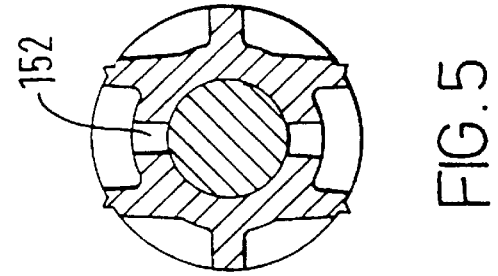
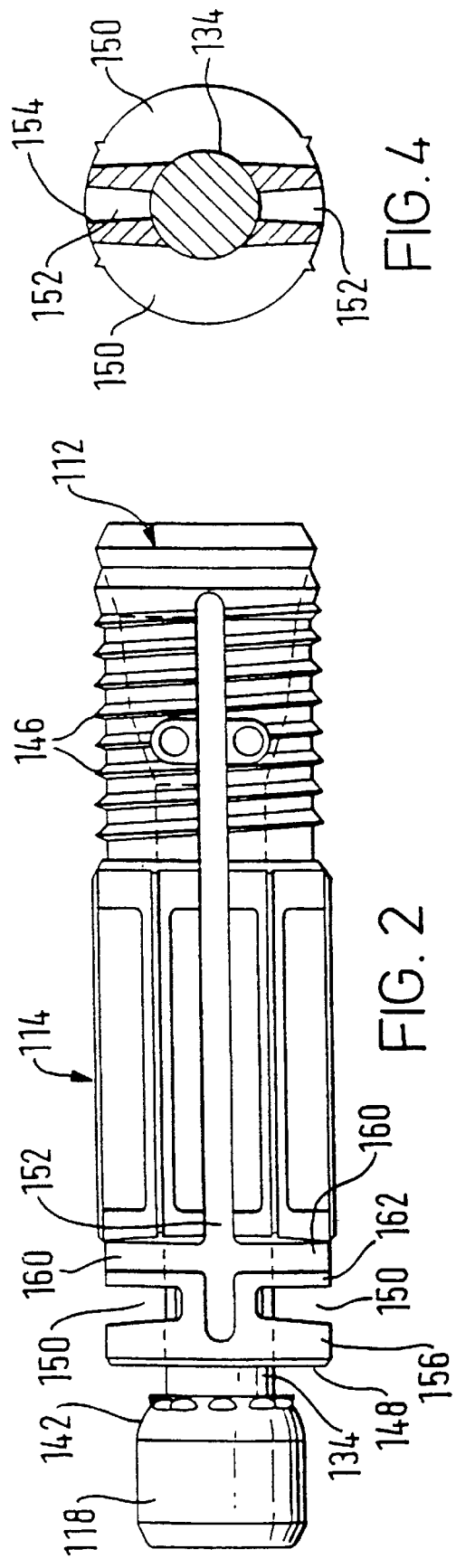
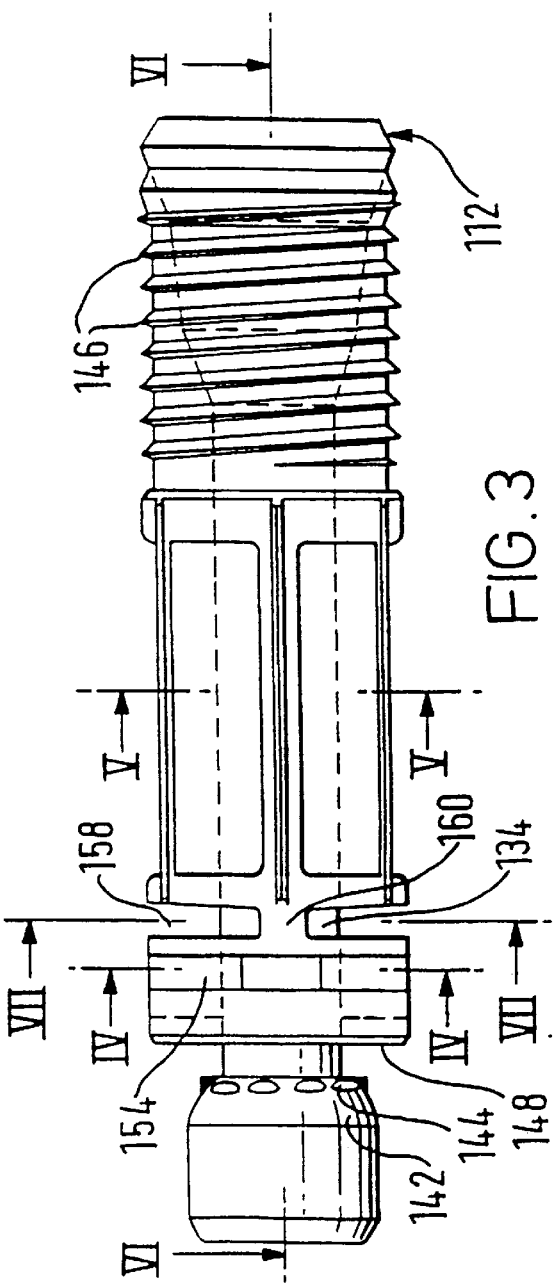

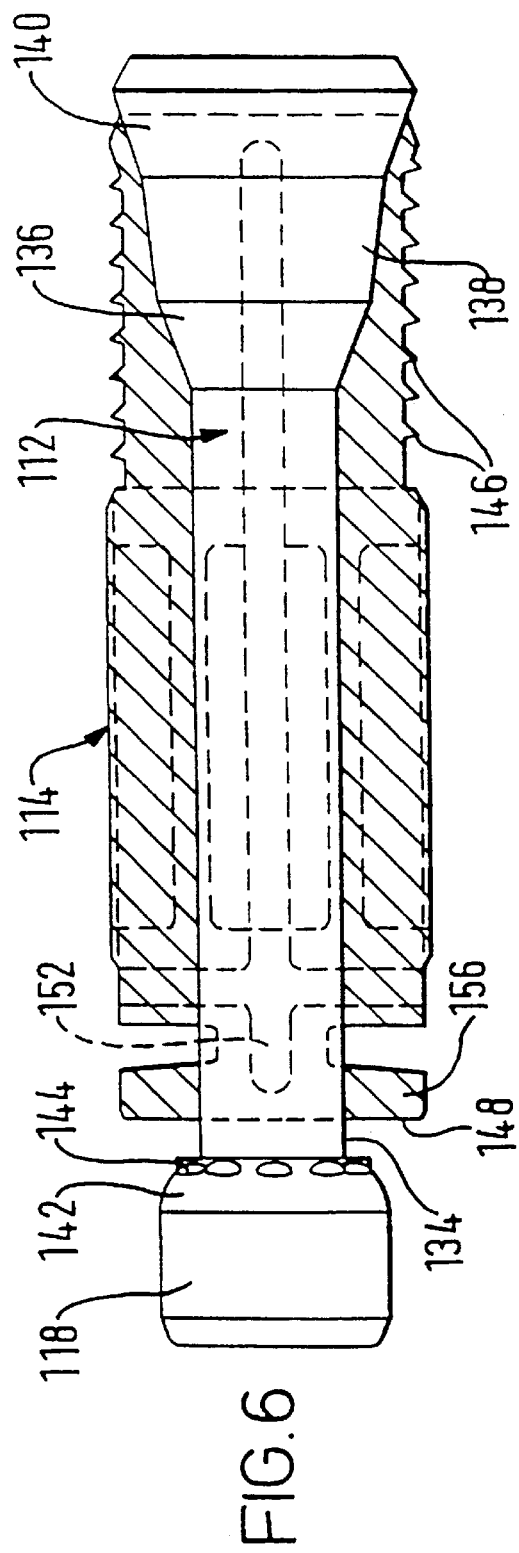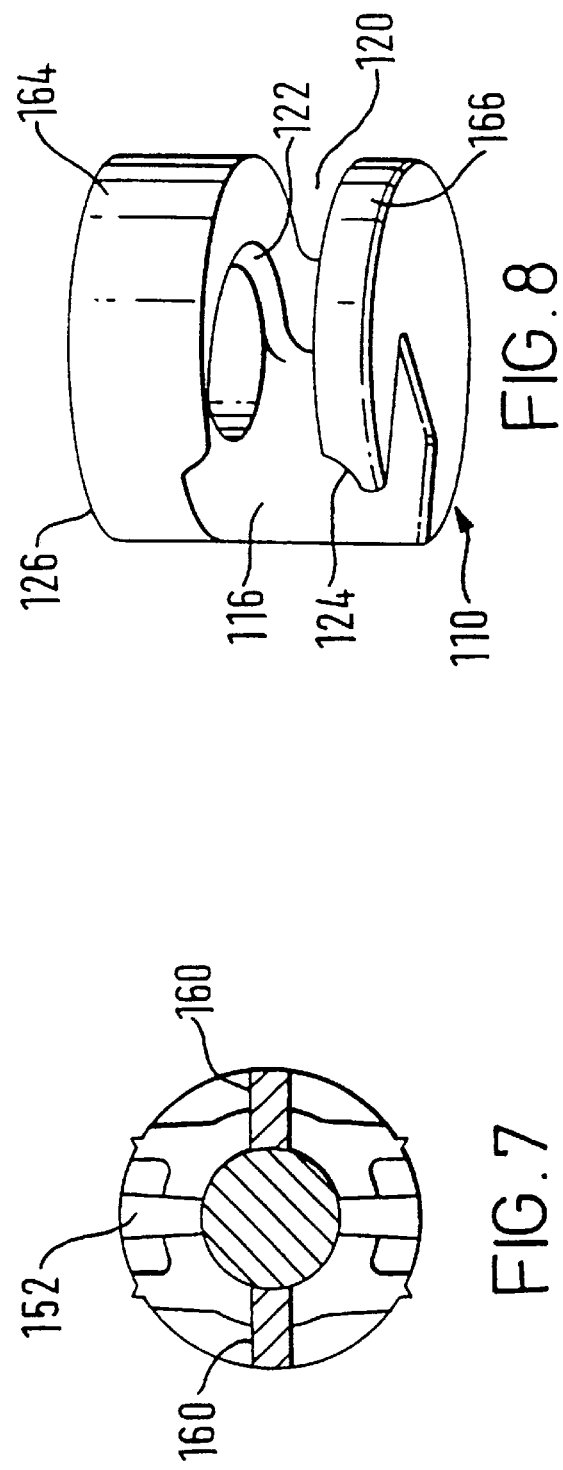

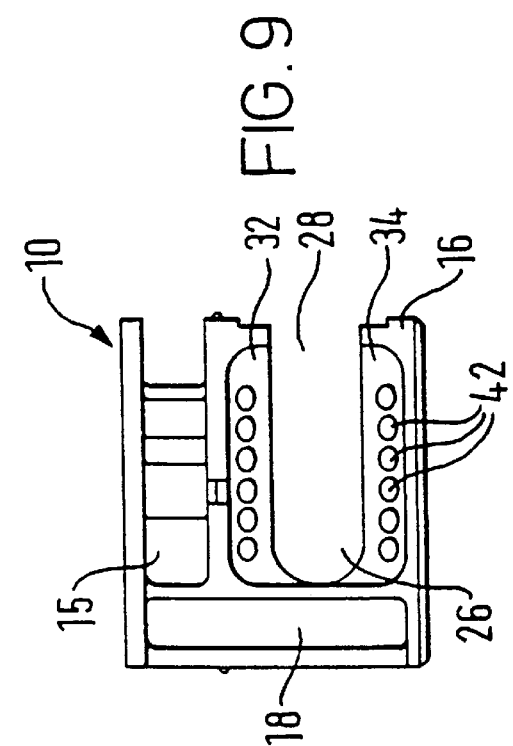
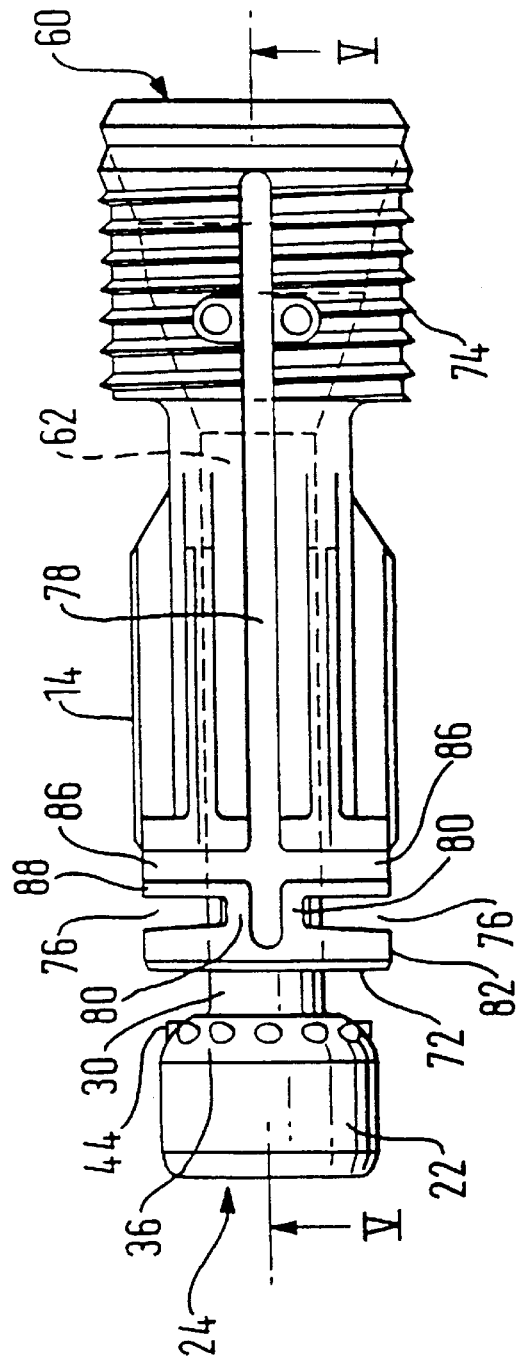

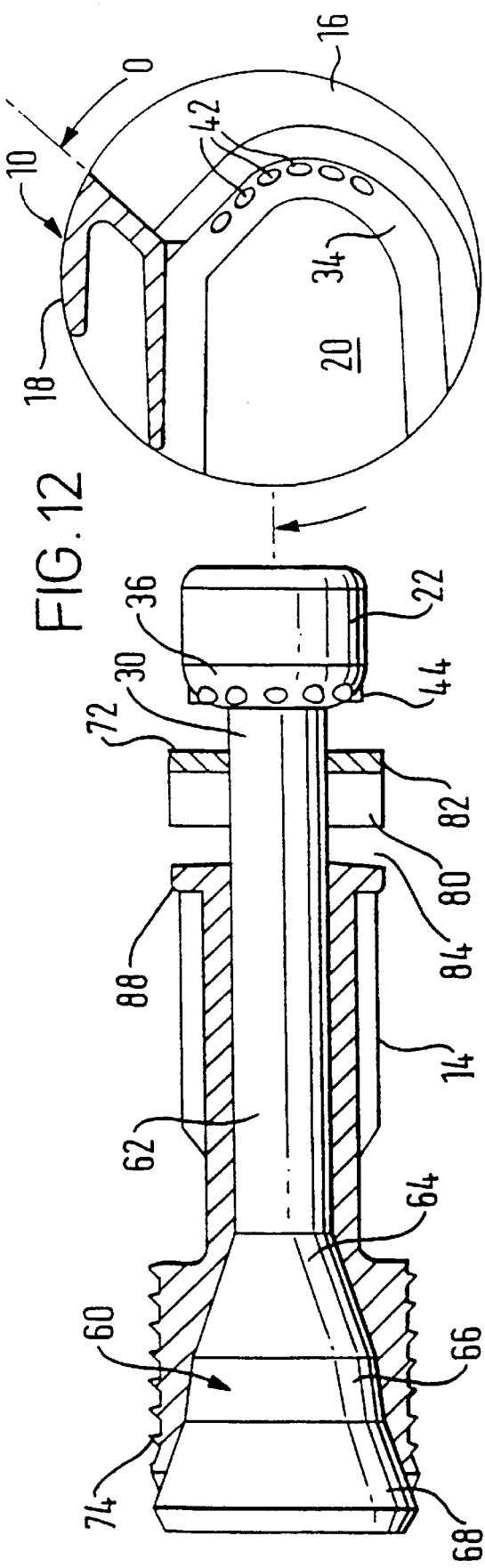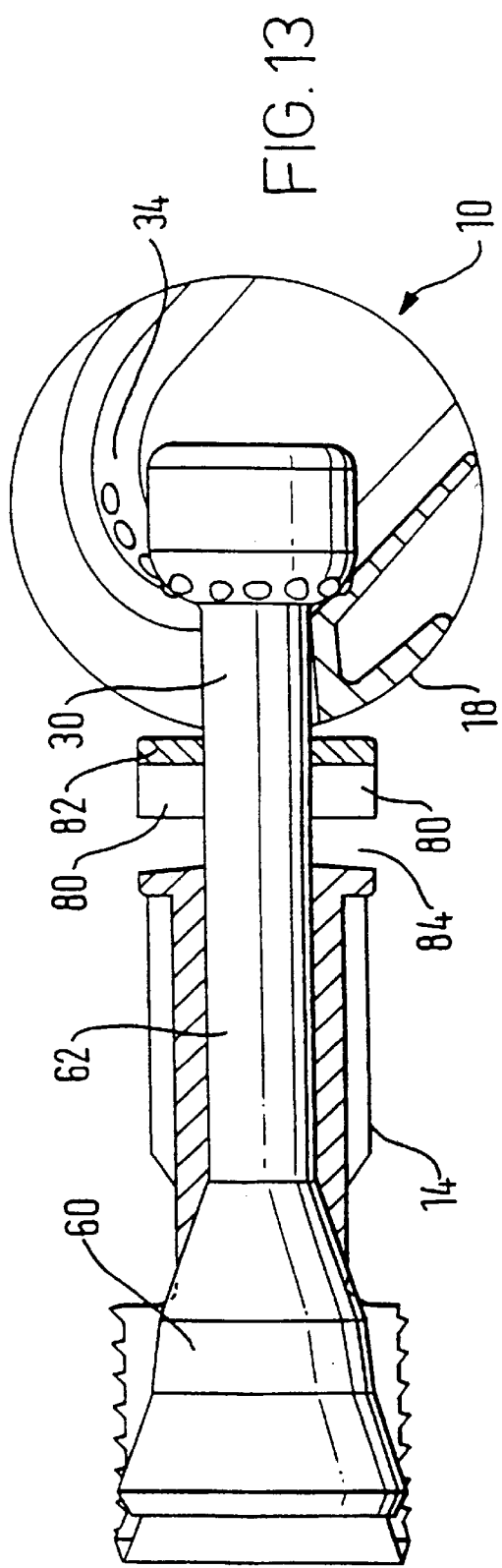

JOINT FORMING DEVICE

The invention relates to joint forming devices and particularly, but not exclusively, to joint forming devices for forming a joint between two members of an item of knock-down furniture.

The applicant's U.S. Pat. No. 5,567,081 discloses a joint forming device for forming a joint between two members. Referring to FIG. 1 of the drawings of the present application, the known joint forming device comprises an elongate fastening element 10 and a rotatable tightening element 12. The fastening element 10 is fixable to a first (14) of the joint members such that at least a head portion 16 thereof protrudes from the joint member. The tightening element 12 is rotatably mounted in a recess 18 in the second 20 of the joint members and has two arcuate camming surfaces 22 which are engageable with the head portion 16 of the fastening element.

The joint forming device further comprises a sleeve 24 for the fastening element 10. One end of the sleeve 24 is fittable into a recess 26 in the first joint member 14. The fastening element 12 has a multi-tapered end portion 28 which is arranged to cause the sleeve to expand and forcibly engage a wall 30 of the recess 26 when the fastening element is moved axially relative to the sleeve.

In use, the sleeve 24 is fitted to the fastening element 10 and then inserted into a bore 32 in the second joint member 20. The bore 32 extends at right angles to and intersects the recess 18. With the sleeve 24 correctly inserted in the bore 32, the head portion 16 of the fastening element is received in a hollow central region of the tightening element so as to be engageable by the camming surfaces 22. This essentially is the position of the fastening element, sleeve and tightening element shown in FIG. 1a.

In order to form a joint between the two members 14, 20 the end of the sleeve 24 which is not received in the bore 32 is inserted into the recess 26 in the first joint member 14. The tightening element is then rotated about its axis of rotation which axis is perpendicular to the longitudinal axis of the fastening element. As the tightening element is so rotated, the action of the camming surfaces 22 is to pull the fastening element axially away from the first joint member 14. The sleeve is prevented from moving with the fastening element by a sleeve collar 34 which abuts an end face 36 of the second joint member. By virtue of the relative movement of the fastening element and sleeve, the multi-tapered end portion 28 is drawn inwardly of the sleeve causing it to expand and forcibly engage the wall 30 of the recess 26. Further rotation of the tightening element causes the joint members to be pulled tightly together so that the joint members are in a state of compression and the fastening element is in a state of tension.

A problem can arise with such a joint forming device if the tightening element is not correctly located with respect to the end face 36 of the second joint member. If the tightening element is located too close to that edge it may prove impossible to tighten the joint since only a small portion of the length of each camming surface will be effective on rotation of the tightening element. This results in very little pulling force being applied to the fastening element so that there is little compression in the joint and thus the joint is weak. If the tightening element is located too far away from the edge of the second joint member, unless an undue amount of force is applied, it is only possible to obtain a small amount of rotation of the tightening element in the tightening direction.

The camming surfaces of known camming elements typically have a lengthwise profile adapted to provide a two-phase tightening action. FIG. 1b is a graph illustrating the relationship between rotation of the camming element and axial movement of the fastening element in a conventional joint forming device and showing the two-phase tightening action. Axial movement in mm is indicated along the vertical axis and rotation in degrees is indicated along the horizontal axis. In the first phase, a relatively "coarse movement" of the pin is provided by portions of the camming surfaces having a relatively steep, or tight, curve, i.e. a curvature adapted to provide a relatively large amount of axial movement of the fastening element for a relatively small amount of rotation of the camming element. The relationship between the rotation of the camming element and the axial movement caused is non-linear and is typically in excess of 0.5 mm for each 10° of rotation. This "coarse movement" is provided for closing a gap between the two panels and causing them to be tightly pressed together, a movement often referred to as pull-up. The second phase of pin movement is caused by portions of the camming surfaces having a relatively flatter curve. The second-phase movement increases the compressive force on the joint and the reduced curvature of the camming surfaces imparts a degree of self-locking, often referred to as lock-up, to the joint forming device. It will be appreciated that the steeper the curve of the camming surfaces at the point of engagement with the head portion of the pin, the more likely it is that the camming element will back-off, i.e. rotate in the sense opposite to the sense in which it is rotated in order to tighten the joint when the panels are loaded in use. Accordingly, camming elements designed to provide the above-mentioned two-phase pin movement are intended to be rotated sufficiently during tightening of the joint to ensure engagement between the head portion of the pin and the flatter portions of the camming surfaces to obtain so-called lock-up.

In the use of the camming element which is the subject of FIG. 1b, the camming element is rotated approximately 50 degrees from the position in which the head portion of the pin is inserted into the hollow region before the camming surfaces engage the head portion. The camming element must then be rotated a further 75 degrees before effective locking of the joint is obtained.

There are several disadvantages with these conventional joint forming devices and their camming elements.

One disadvantage is that relatively high turning forces are required to rotate the camming element during the pull-up phase. It will be appreciated that the cam is relatively highly 'geared' during the pull-up phase and the steeper the curve of the camming surfaces, the more torque input is required from the user. It is desirable to reduce the effort required of the user.

A further problem associated with this design is that in order to cope with the relatively high forces acting on it, the camming element must be heavily built. If the camming element is not made strong, it may burst under the loads imposed on it; the phenomenon of cam bursting will be familiar to those skilled in the art.

It will be appreciated that such camming elements are produced in vast quantities usually by means of diecasting techniques. Diecasting metals are relatively expensive and it is therefore desirable to reduce the weight of metal required for each camming element as much as possible without significantly reducing the strength thereof.

A further disadvantage of known joint forming devices is that they lack tolerance. That is, if the recesses and bores in which the device parts are fitted are not made accurately, it may not be possible to form a reliable joint.

In more detail, in use the camming element is usually fitted into a recess in a major surface of a first joint member. This recess either breaks an edge of the panel or is communicated with the edge by means of a bore which extends from the recess to the edge. This arrangement allows the head portion of the pin to be inserted into the camming element so that it can be engaged by the camming surfaces on rotation of the camming element.

If the camming element is located too close to the edge of the joint member it may prove impossible to tighten the joint since only a small portion of the length of each camming surface will be effective on rotation of the tightening element. This results in very little pulling force being applied to the fastening element so that there is little compression in the joint and thus the joint is weak.

If the camming element is located too far away from the edge of the joint member, unless an undue amount of force is applied, it is only possible to obtain a small amount of rotation of the camming element in the tightening direction. In this case it is not usually possible to rotate the camming element sufficiently for the head portion to engage the portion of the cam which provides lock-up and if rotation is continued, bursting of the cam can result. The result is that there is no effective locking action and the camming element will tend to back-off if the joint is loaded which results in a weak joint.

It is an object of the invention to at least partially overcome the above-described problems.

The invention provides a device for forming a joint between two members, said device comprising an elongate fastening element, a rotatable tightening element and a sleeve for said fastening element, said tightening element comprising at least one arcuate camming surface engageable with a head portion of said fastening element such that rotation of said fastening element about an axis of rotation thereof pulls said fastening element generally towards said axis of rotation, said sleeve (i) being adapted such that, in use, a leading end portion thereof remains in a fixed position relative to said axis of rotation, (ii) having an opposite end portion adapted to be radially expandable by said fastening element when so pulled for fixing said fastening element to one such joint member and (iii) being partially collapsible in the lengthwise direction thereof.

Preferably, the sleeve comprises a wall provided with collapsing means whereby the sleeve is partially collapsible in the lengthwise direction thereof.

The collapsing means may define a plurality of collapsible zones at spaced apart locations along the length of the sleeve.

The collapsing means may comprise at least one portion of reduced thickness defined in said wall. The or each said portion of reduced thickness may define a groove extending in said lengthwise direction.

The collapsing means may comprise at least one aperture defined in said wall. The or each said aperture may extend between said first and second end portions of the sleeve. The or each said aperture may be a cruciate aperture.

Preferably, the peripheral surface of the camming element engageable by said sleeve is disposed at a substantially constant radial distance from an axis of rotation of the tightening element.

The invention also provides a device for forming a joint between two members, said device comprising (i) a tightening element to be rotatably fitted to a first such joint member and having at least one arcuate camming surface, (ii) an elongate fastening element having a leading end portion engageable with the or each said camming surface such that, in use, rotation of said tightening element causes axial movement of said fastening element towards said tightening element, and (iii) a sleeve for said fastening element, said sleeve having a first end portion to be fitted in a recess in a second such joint member and being cooperable with said fastening element such that said axial movement causes radial expansion of said sleeve first end portion for forcibly engaging a wall of such a recess and a second end portion which is arranged to engage a peripheral surface of said tightening element when said leading end portion engages the or each said camming surface at least over a substantial portion of the extent of said rotation of the tightening element when said engaging surface and camming surfaces are so engaged.

In order that the invention may be well understood, embodiments thereof, which are given by way of example only, will now be described with reference to the accompanying drawings, in which:

FIG. 1a is a sectional side elevation of the known joint forming device disclosed in U.S. Pat. No. 5,567,081;

FIG. 2 is a side elevation of a fastening element and a sleeve therefor according to the invention;

FIG. 3 shows the fastening element and sleeve of FIG. 2 rotated through ninety degrees about the longitudinal axis of the fastening element;

FIG. 4 is a section on line IV—IV in FIG. 3;

FIG. 5 is a section on line V—V in FIG. 3;

FIG. 6 is a section on line VI—VI in FIG. 3;

FIG. 7 is a section on line VII—VII in FIG. 3; and

FIG. 8 is a perspective view from below of a tightening element.

FIG. 9 is a front elevational view of an alternative tightening element according to the invention;

FIG. 10 is a side elevational view of the tightening element;

FIG. 11 shows an alternative fastening element and a sleeve for use with the tightening element;

FIG. 12 is a sectional view of the tightening element, fastening element and sleeve viewed along lines V—V in FIGS. 10 and 11;

FIG. 13 is a view corresponding to FIG. 12 showing the tightening element in a position of maximum rotation in the tightening direction.

Figure 1A:
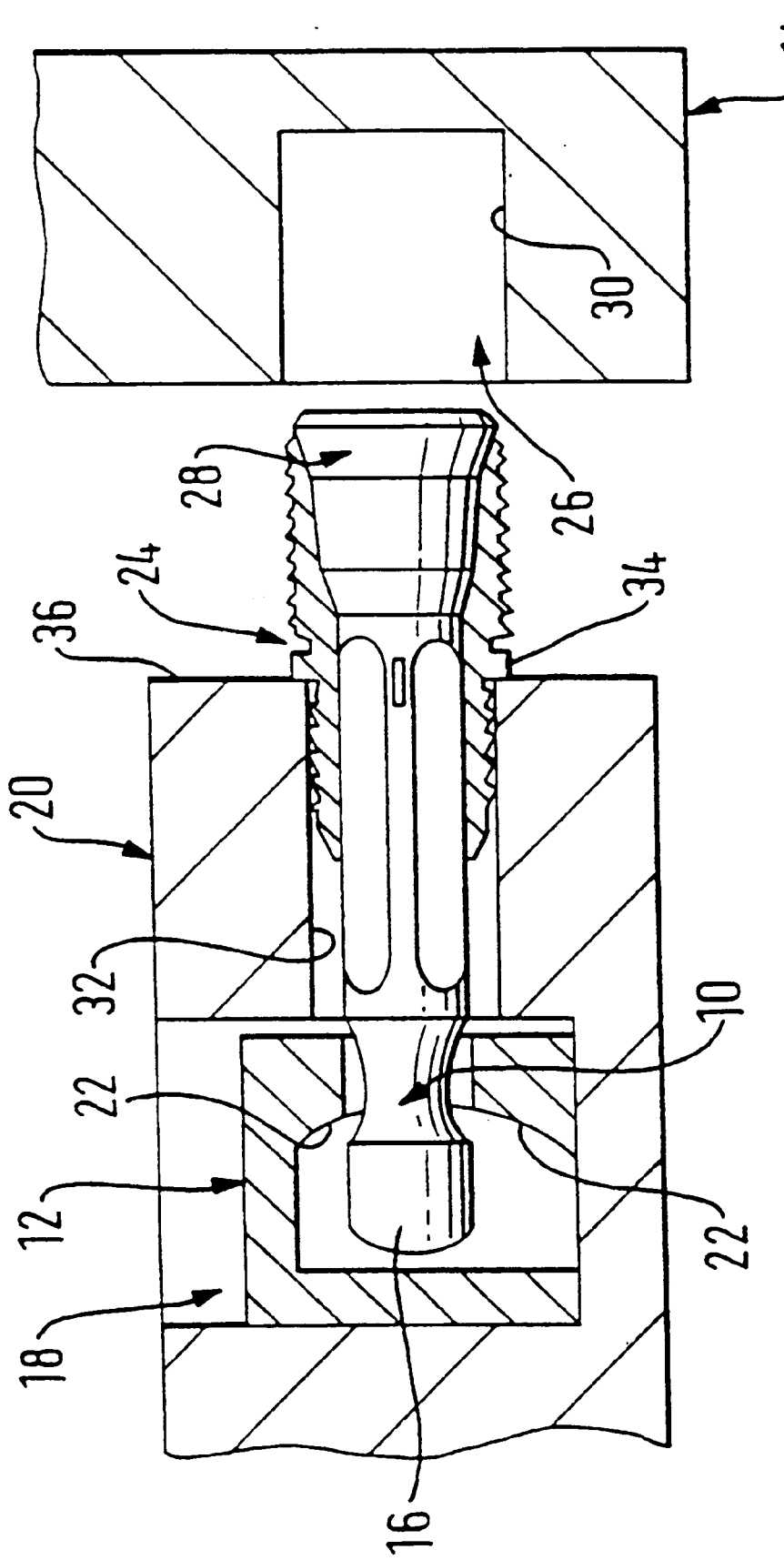
FIG. 1b is a graph showing the relationship between the amount of rotation of a prior art tightening element and the axial movement of an elongate fastening element caused by such rotation.

Referring to FIGS. 2 to 8, a joint forming device comprises a tightening element in the form of a rotatable drum 110, a fastening element in the form of an elongate pin 112 and a sleeve 114 for the pin 112.

The rotatable drum 110 which is shown in FIG. 8 has an opening 116 through which a head portion 118 of the pin can be inserted into a hollow area at the centre of the drum. A slot 120 extends from the opening 116 partially circumferentially about the drum. The drum defines two arcuate camming surfaces 122, 124 which are separated one from the other by the slot 120. Suitable means (not shown) are provided in the upper surface 126 of the drum to allow the drum to be rotated by means of a hand tool such as a screwdriver or hexagonal wrench. Preferably, the pin 112 and drum 110 are so designed that the head portion 118 engages the camming surface 122 upon initial insertion in order to locate the pin in its correct position. This may occur in combination with the leading end 148 of the sleeve 114 engaging the outer peripheral surface 166 of the drum.

Referring particularly to FIG. 6, the pin 12 which is preferably a diecast moulding, comprises the head portion 118, an expander portion disposed at the end of the pin opposite to the head portion and a shank 134 which extends between and interconnects the head and expander portions. The shank 134 is a plain cylinder whereas the expander portion comprises three frusto-conical portions 136, 138, 140 disposed in end-to-end relationship. The head portion 118 comprises a convex engaging surface 142 for cooperably engaging with the camming surfaces 122, 124 when the head portion 118 is received in the hollow interior of the rotatable drum 110. Preferably, the head portion 118 is toroidal in shape.

The engaging surface 142 may be provided with a plurality of circumferentially spaced apart protrusions 144 which are engageable with the camming surfaces 122, 124 or, more preferably, with depressions (not shown) provided in the camming surfaces. These protrusions and depressions, if provided, serve as a locking mechanism. For a more detailed description of the locking mechanism feature, attention is directed to the applicant's United Kingdom Patent No. 2246826.

The sleeve 114 comprises a generally annular wall which defines a through-hole extending axially between the opposed ends of the sleeve. The through-hole is configured at one end to mate with the frusto-conical portions 136, 138, 140 of the pin 112. The remainder of the through-hole is configured to fit closely around the shank 134 of the pin. It will be noted that the leading end and expander portions of the pin 112 are somewhat larger in diameter than the portion of the through-hole which surrounds the shank 134. In practice, it is envisaged that the sleeve will be made of a plastics material moulded directly onto the pin by a process known as insert moulding. Insert moulding is a technique well known to those skilled in the art and will accordingly not be described in any detail herein. Alternatively, the sleeve may comprise two parts which snap together about the pin in which case the parts of the sleeve may be hingeably connected.

When the sleeve is correctly fitted on the pin 112, there is a gap between the engaging face 142 of the pin and an adjacent end face 148 of the sleeve. When the drum 110 and pin 112 are assembled, the portion of the shank 134 exposed in the gap between the engaging face 142 and the end face 148 is receivable in the drum slot 120. This allows the drum to be rotated about its axis of rotation with the head portion 118 of the pin received in its hollow interior.

At the end of the sleeve which houses the frusto-conical portions 136, 138, 140 of the pin, a helically extending barb 146 is provided on the outer surface of the sleeve for improving the grip between the sleeve and the joint member in which the barbed end is received. Of course, the barb 146 need not be helical and all manner of protrusions may be provided on the sleeve for the same purpose as is well known to those skilled in the art.

The sleeve 114 is provided with collapsing means whereby the sleeve is partially collapsible in the lengthwise direction thereof. The collapsing means are adapted such that the strength of the sleeve in compression is selectively reduced.

In the embodiment, the collapsing means takes the form of two opposed apertures 150 each of which extends partially circumferentially of the sleeve and two cruciate apertures 152. The cruciate apertures 152 are disposed at opposite sides of the sleeve and have respective lengthwise extending portions which extend substantially over the entire length of the sleeve.

The apertures 150 are disposed at the lefthand end (as viewed in FIGS., 2, 3 and 6) of the sleeve and together with the lefthand ends of the lengthwise extending portions of the cruciate apertures 152 define four ribs 154 which connect a ring-like leading end portion 156 of the sleeve to the remainder of the sleeve.

The transverse portions 158 of the cruciate slots 152 are arranged to define two opposed ribs 160 which are radially offset from the ribs 154 and in the radial direction extend generally perpendicular thereto. The apertures 150 and cruciate apertures 152 additionally define therebetween two arcuate segments 162. The ribs 160 connect the arcuate segments 162, the ribs 154 and the ring-like leading end portion 156 to the remainder of the sleeve. It will be appreciated that this arrangement of apertures, interconnecting ribs and arcuate segments defines a collapsible zone adjacent the leading end 156 of the sleeve. It will also be appreciated that the portions of the cruciate apertures 152 extending lengthwise of the sleeve from the transverse portions 160 to the barbed end of the sleeve also contribute, albeit to a lesser extent, to the collapsibility of the sleeve.

In use, to form a joint between two members, the rotatable drum 110, pin 112 and sleeve 114 are fitted together in suitable recesses and bores provided in the joint members in the same general way as the fastening element 10, tightening element 12 and sleeve 24 of the known joint forming device shown in FIG. 1a. The tightening procedure is likewise essentially the same. Accordingly, in the description which follows, use of the embodiment to form a joint between two members will be described with reference to the joint members shown in FIG. 1a and like reference numerals will be used to specify the joint members together with their associated bores and recesses.

A difference between the known device of FIG. 1a and the device shown in FIGS. 2 to 8, is that when the camming surfaces 122, 124 of the rotatable drum 110 engage the engaging surface 142 of the pin 112, the end face 148 of the ring-like leading end portion 156 of the sleeve engages peripheral surfaces 164, 166 of the drum on either side of the slot 120. This prevents axial movement of the sleeve relative to the drum so that as the drum is rotated in a tightening direction there is relative movement between the sleeve and the pin which causes the frusto-conical portions 136, 138 and 140 to be drawn axially inwardly of the sleeve and thereby radially expand the barbed end of the sleeve.

It will be appreciated that one advantage of this arrangement as compared with the known arrangement shown in FIG. 1a, is that at the start of the tightening process the head portion 118 of the pin is always correctly positioned with the engaging surface 142 engaging the camming surfaces 142. This is because the initial position of the engaging surface of the pin relative to the camming surfaces is determined by the geometry of the drum 110, pin 112 and sleeve 114 and not, as is the case with the known device shown in FIG. 1a, by the distance between the end face 36 of the joint member 20 and the recess 18 provided for the drum. Accordingly, it can be assured that a good joint will be made since the drum will always be rotatable to a position in which the optimum engagement between the camming surfaces and the engaging surface of the pin is achieved.

Further advantages of the joint forming device of the embodiment are obtained by virtue of the collapsibility of the sleeve 114. As previously described, the initial pulling action of the drum causes relative movement between the pin and sleeve which results in the barbed end of the sleeve forcibly engaging the wall 30 of the recess 26. Once this position is reached, further rotation of the drum generates a compression force in the sleeve which causes the partial collapse of the sleeve in the region of the ribs 154, 160. It will be appreciated that the compression force arises because the position of the sleeve is fixed between the peripheral surfaces 164, 166 of the drum and the wall 30 of the recess and that if the sleeve was not capable of collapse further rotation of the drum by means of conventional hand tools would be extremely difficult, if not impossible.

The additional rotation of the drum made possible by the collapse of the sleeve provides two benefits. Firstly, if there is any gap between second joint member 14 and the end face 36 of the first joint member, as the pin is pulled inwardly of the drum, the gap is closed. Secondly, the collapse of the sleeve allows the two joint members when in abutting relationship to be tightly pulled together putting the joint members into compression in the region of the joint.

It will be appreciated that the collapsing means is not limited to the form shown in the embodiment. For example, single apertures or groups of apertures may be provided at intervals along the sleeve to define a plurality of spaced apart collapsible zones.

It will also be appreciated that the collapsing means is not limited to apertures provided in the sleeve wall. For example, recesses defining portions of reduced thickness may be provided in the sleeve wall thereby increasing the collapsibility of the sleeve.

It will be appreciated that in the embodiment, the position of the leading end portion 156 of the sleeve remains fixed relative to the axis of rotation of the drum 110. Because the sleeve remains fixed relative to the drum, the fastening element is able to move relative to the sleeve for expanding same. It will be understood that it is not essential for the leading end of the sleeve to engage the periphery of the drum in order for the position of the sleeve to be fixed relative to the axis of rotation of the drum.

Referring to FIGS. 9 to 13 a joint forming device for forming a joint between two members comprises a tightening element 10, a fastening element in the form of a pin 12 and a sleeve 14 for the pin. The tightening element 10 has a cylindrical drum-like body which comprises two generally cylindrical portions 15, 16 which are interconnected by means of a web 18. The drum-like body defines a centrally disposed cavity 20 for receiving a head portion 22 of the pin 12, a generally oblong opening 26 through which the head portion 22 can be inserted into the cavity 20 and a slot 28 which extends circumferentially about the body. The slot 28 is sized to receive a neck portion 30 of the pin 12 when, in use, the tightening element is rotated anticlockwise (as viewed in FIGS. 12 and 13) with the head portion 22 received in the cavity 20.

A suitable aperture is provided in the uppermost surface (as viewed in FIGS. 9 and 10) of the body portion 15 to permit rotation of the tightening element by means of a suitable tool such as a screwdriver or the like.

The drum-like body further defines two camming surfaces 32, 34 disposed one on each side of the slot 28. The camming surfaces 32, 34 are adapted for engaging an engaging surface 36 of the head portion 22. In the lengthwise direction thereof, the camming surfaces have an arcuate profile which is configured such that when the tightening element is rotated anticlockwise whilst head portion 22 is engaged with the camming surfaces 32, 34, the pin 12 is caused to move in the axial direction thereof towards the axis of rotation 40 of the tightening element.

Figure 14:
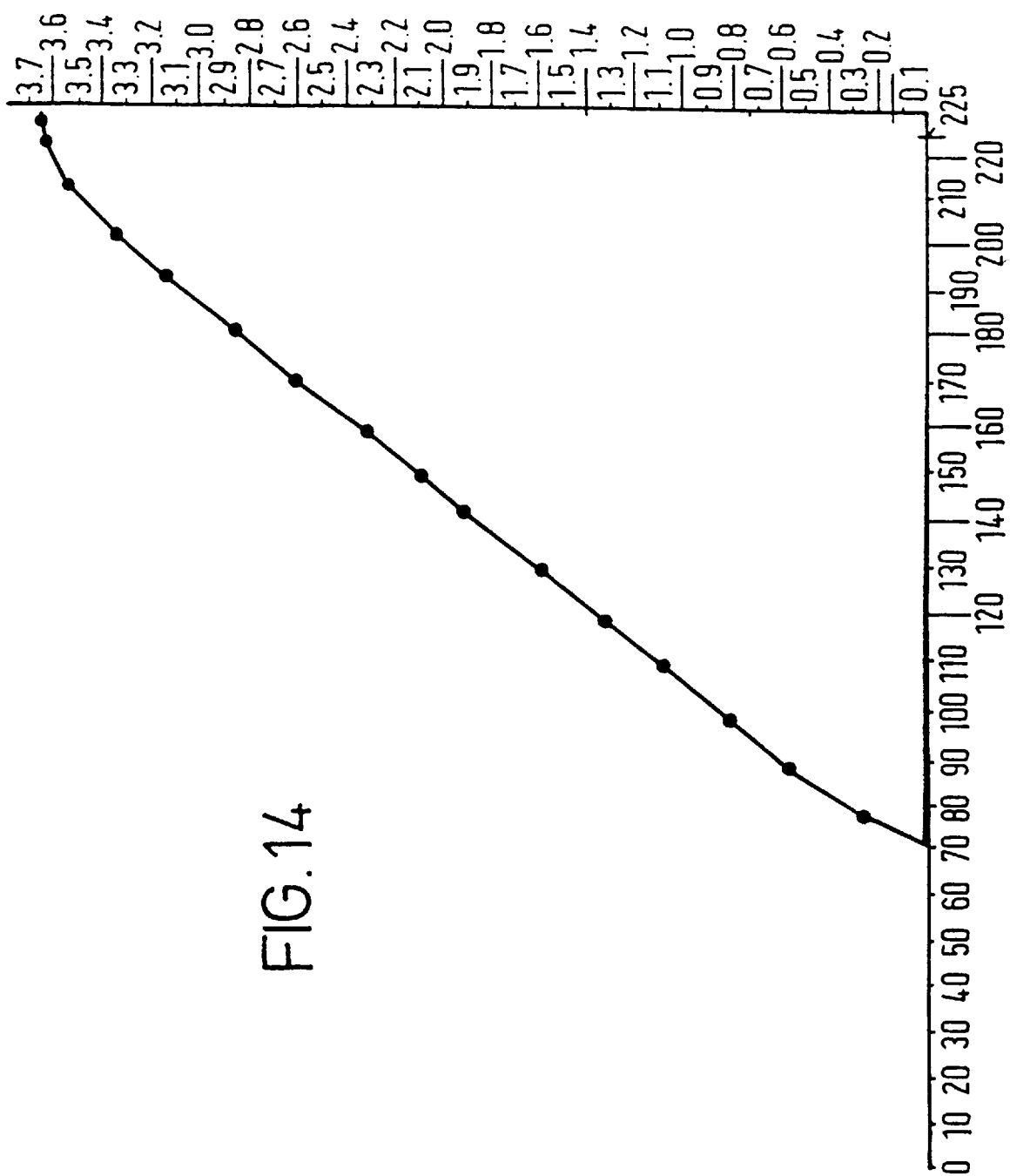
FIG. 14 is a graph showing the relationship between the amount of rotation of the tightening element of FIG. 9 and axial movement of the elongate fastening element of FIG. 11 caused by such rotation.

The curvature of the arcuate profile of the camming surfaces is adapted to provide a substantially linear relationship between the amount of rotation of the tightening element and the amount of axial movement of the pin 12 over a substantial portion of the range of such movement as described in more detail hereinbelow and as shown in FIG. 14.

In directions transverse the arcuate length thereof, the camming surfaces 32, 34 are concave so as to provide extensive surface contact with a convex, preferably toroidal engaging surface 36 of the pin 12.

A plurality of depressions 42 are provided in the camming surfaces 32, 34 at spaced apart locations along the length of the surfaces. The depressions 42 are configured to mate with conical protrusions 44 provided at substantially spaced apart locations on the engaging surface 36. The inter-engagement of the depressions 42 and protrusions 44 provides a ratchet-like locking mechanism which provides resistance to rotation of the tightening element in both the clockwise and anticlockwise directions. For a more detailed description of the locking mechanism feature, attention is directed to the applicant's patent GB 2246826B.

Referring to FIGS. 12 and 13, it will be seen that the web 18 has a generally U-shaped cross-section and is defined by relatively thin walls. In the embodiment the walls have a thickness in the range of 0.4 to 1.0 mm. This configuration considerably reduces the weight of metal in the web and at the same time provides the necessary strength to maintain the body portions 15, 16 in a fixed spaced apart relationship.

To further reduce the amount of metal used in forming the tightening element, the cylindrical body portions 15, 16 are thinned in regions 50, 52 located to the rear of the tightening element diametrically opposite to the opening 26 such that the camming surfaces are defined on respective ribs 54, 56 which project from the body portions 15, 16.

The web 18 defines the limit of the tightening element in the tightening direction as shown by FIG. 13. The web is arranged such that the tightening element can be rotated about its axis of rotation 40 through an angle φ of 225 degrees from the position in which the pin is inserted into the opening.

Preferably, the tightening element is formed by diecasting using a suitable zinc diecasting alloy.

The pin 12 is preferably a diecast moulding and comprises the head portion 22, an expander portion 60 and a shank 62 which connects the head and expander portions. The shank 62 is a plain cylinder whereas the expander portion 60 comprises three frusto-conical portions 64, 66, 68 disposed in end-to-end relationship.

The sleeve 14 for the pin 12 comprises a generally annular wall which defines a through-hole extending axially between the opposed ends of the sleeve. The through-hole is configured at one end to mate with the frusto-conical portions 64, 66, 68 of the pin 12. The remainder of the through-hole is configured to fit closely around the shank 62 of the pin. It will be noted that the head portion and expander portions of the pin 12 are somewhat larger in diameter than the portion of the through-hole which surrounds the shank 62. In practice, it is envisaged that the sleeve will be made of a plastics material moulded directly onto the pin by a process known as insert moulding. Insert moulding is a technique well known to those skilled in the art and will accordingly not be described in any detail herein. Alternatively, the sleeve may comprise two parts which snap together about the pin in which case the parts of the sleeve may be hingeably connected.

When the sleeve is correctly fitted on the pin, there is a gap between the engaging surface 36 of the pin and an adjacent end face 72 of the sleeve. The portion of the shank 62 exposed in this gap defines the neck 30 of the pin 12.

At the end of the sleeve which houses the frusto-conical portions 64, 66, 68 of the pin, a helically extending barb 74 is provided on the outer surface of the sleeve for improving the grip between the sleeve and the joint member in which, in use, the barbed end is received. Of course, the barb 74 need not be helical and all manner of protrusions may be provided on the sleeve for the same purpose as is well known to those skilled in the art.

The sleeve 14 is provided with collapsing means whereby the sleeve is partially collapsible in the lengthwise direction thereof. The collapsing means are adapted such that the strength of the sleeve in compression is selectively reduced.

In the embodiment, the collapsing means is defined by two opposed apertures 76 each of which extends partially circumferentially of the sleeve and two cruciate apertures 78. The cruciate apertures 78 are disposed at opposite sides of the sleeve and have respective lengthwise extending portions which extend substantially over the entire length of the sleeve.

The apertures 76 are disposed at the lefthand end (as viewed in FIG. 11) of the sleeve and together with the lefthand ends of the lengthwise extending portions of the cruciate apertures 78 define four ribs 80 which connect a ring-like leading end portion 82 of the sleeve to the remainder of the sleeve.

The transverse portions 84 of the cruciate slots 78 are arranged to define two opposed ribs 86 which are radially offset from the ribs 80 and in the radial direction extend generally perpendicular thereto. The apertures 76 and cruciate apertures 78 additionally define therebetween two arcuate segments 88. The ribs 86 connect the arcuate segments 88, the ribs 80 and the ring-like leading end portion 82 to the remainder of the sleeve. It will be appreciated that this arrangement of apertures, interconnecting ribs and arcuate segments defines a collapsible zone adjacent the end 72 of the sleeve. It will also be appreciated that the portions of the cruciate apertures 78 extending lengthwise of the sleeve from the transverse portions 84 to the barbed end of the sleeve also contribute, albeit to a lesser extent, to the collapsibility of the sleeve.

In use to form a joint between two members, the tightening element 10, pin 12 and sleeve 14 are fitted together in suitable bores and recesses provided in the joint members. In more detail, the tightening element is fitted into a recess formed in a major face of one edge of a first joint member and spaced a predetermined distance from an edge of the joint member. The recess housing the tightening element communicates with the edge of the first joint member by means of a bore extending perpendicular to the axis of the recess. The head portion 22 of the pin 12 can be inserted into the cavity 20 of the tightening element by aligning the oblong opening 26 with the bore in the first joint member and inserting the pin 12 and sleeve 14 into that bore. When so fitted, the end of the sleeve provided with the barb 74 protrudes from the joint member. This end of the sleeve is push-fitted into a recess defined in an edge of the second joint member thereby forming a loose joint between the two members.

In order to tighten the joint between the two members, the tightening element 10 is rotated about its axis of rotation 40 to bring the camming surfaces 32, 34 into engagement with the engaging surface 36 of the pin 12. As the tightening element is so rotated the neck 30 enters the slot 28 and the end face 72 of the sleeve 14 bears against the periphery of the tightening element on either side of the slot. The engagement between the sleeve 14 and the tightening element prevents axial movement of the sleeve relative to the tightening element so that as the tightening element causes the pin to move toward the axis of rotation 40, there is relative movement between the sleeve 14 and the pin 12. This relative movement between the pin and the sleeve causes the frusto-conical portions 64, 66, 68 to be drawn axially inwardly of the sleeve and thereby radially expand the barbed end of the sleeve. It will be appreciated that the extension of the cruciate aperture 78 into the barbed end of the sleeve facilitates expansion of the sleeve. This expansion of the sleeve firmly fixes the sleeve and pin 12 in the recess in the second joint member.

Further rotation of the tightening element generates a compression force in the sleeve which causes partial collapse of the sleeve in the region of the ribs 80, 86. It will be appreciated that the compression force arises because the sleeve is fixed in position between the recess in the second joint member and the periphery of the tightening element and that if the sleeve was not capable of collapse further rotation of the tightening element by means of conventional hand tools would be extremely difficult if not impossible.

The additional rotation of the drum made possible by the collapse of the sleeve 14 provides two benefits. Firstly, if there is any gap between the joint members once the barbed end of the sleeve is expanded into its recess in the second joint member, the gap is closed. Secondly, the collapse of the sleeve allows the two joint members to be pulled together putting the joint members into compression in the region of the joint.

FIG. 14 shows the relationship between the amount of rotation of the tightening element 10 and the axial movement of the pin 12 caused by such rotation. The amount of rotation in mm is indicated along the vertical axis of the graph and the amount of rotation in degrees is indicated along the horizontal axis. It will be noted that the relationship between rotation and axial movement is substantially linear throughout the range of the axial movement of the pin. In the embodiment the relationship is that for each 10 degrees of rotation of the tightening element in the tightening direction, approximately 0.25 mm of axial movement of the pin is caused.

This provides a relatively low gearing compared with the conventional prior art tightening elements, discussed with reference to FIG. 1b and thus the user is required to input less torque in order to rotate the tightening element. It will be appreciated that this is a preferred embodiment. In practice it is envisaged that to obtain this 'low torque' effect the arcuate profile of the camming surfaces should be adapted to cause less than 0.3 mm of pin movement for each 10 degrees of rotation.

A further benefit of the relatively shallow curve of the arcuate camming surfaces is that lock-up can be achieved at substantially any point of engagement of the engaging surface and the camming surfaces. In the preferred embodiment this lock-up is augmented by the locking mechanism provided by interengagement of the depressions 42 and protrusions 44 in order to provide a secure joint.

In the embodiment the linear relationship between tightening element rotation and axial pin movement exists substantially throughout the range of pin movement. In practice it is envisaged that at the opposite ends of the range there may be some departure from this linear relationship. At positions of maximum rotation it may be necessary to vary the curvature of the camming surfaces due to problems with coring in the moulding process. At the opposite end of the camming surfaces where engagement with the head portion 22 first occurs it may be necessary to provide a steeper curve to prevent the ribs which define the tightening surfaces becoming too thin at the periphery of the drum. It is, however, preferred that there is a linear relationship between camming element rotation and pin movement over at least 75 percent of the range of said pin movement.

Figure 1B:
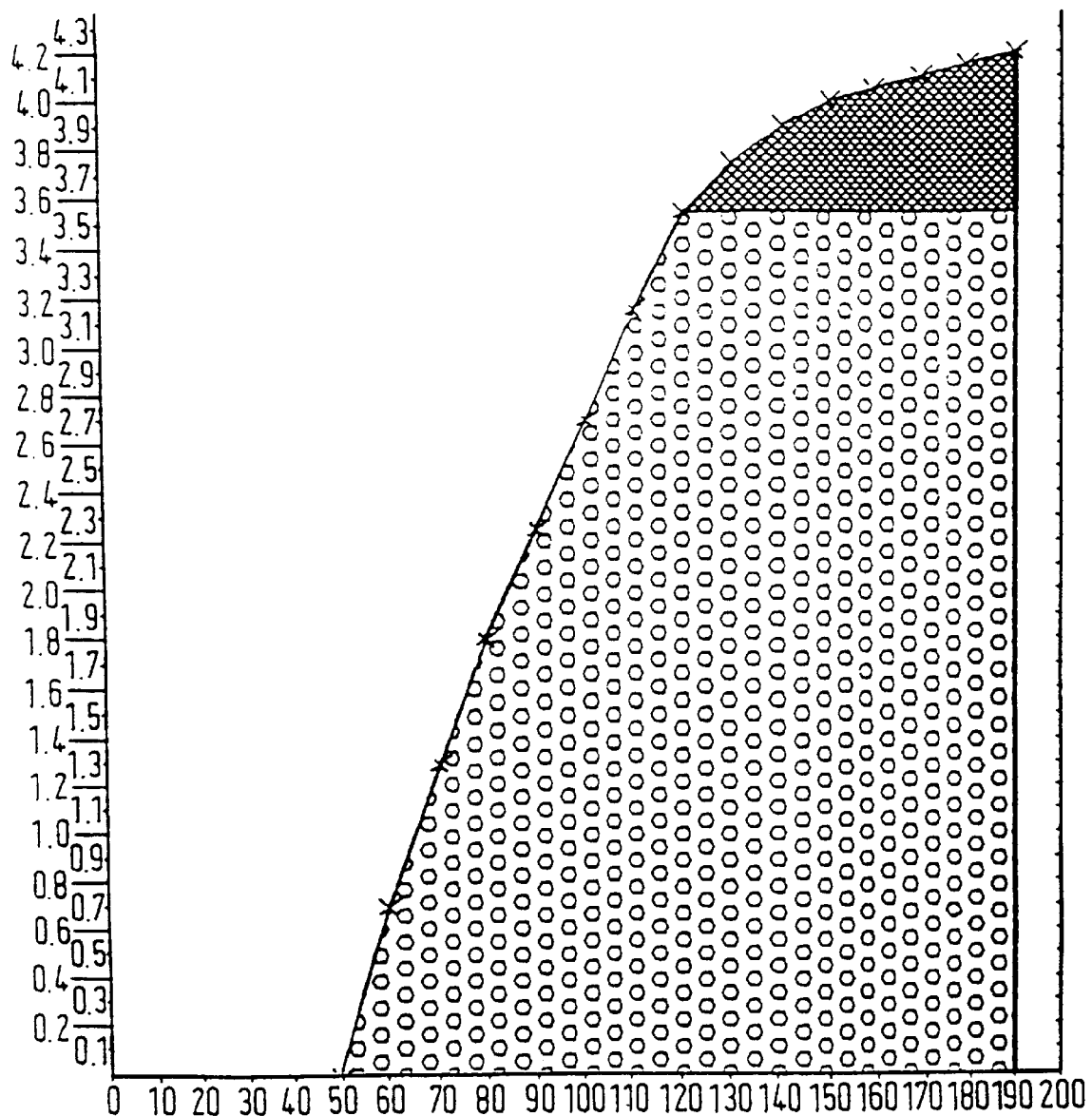

Referring to FIGS. 1b and 14 it will be noted that the tightening elements must be rotated through an angle of 50 to 70 degrees before engagement of the camming surfaces and the head portion of the pin occurs. The extent of this pre-engagement rotation is determined by the dimensions of the opening through which the head portion is inserted into the tightening element central cavity and the position of the camming surfaces relative to the periphery of the tightening element.

It will be appreciated that by configuring the slot 28 to allow rotation beyond 190 degrees, the tightening element 10 is able to provide linear camming action requiring low torque input with a range of axial movement of the pin comparable to that obtained using a conventional tightening element. This is particularly useful where the tightening element is used with a collapsible sleeve such as the sleeve of the embodiment. This allows the tightening element to be configured to provide sufficient axial movement of the pin to expand the barbed end of the sleeve and collapse the opposite end of the sleeve.

It will be appreciated that the tightening element 10 and the joint forming device described herein will function to form a satisfactory joint even where there is a relatively wide degree of inaccuracy of the positioning of the recess for the tightening element relative to the edge of the joint member. The tightening element and the joint forming device can therefore be characterised as more tolerant than conventional tightening elements and joint forming devices.

What is claimed is:

1. A device for forming a joint between two members, said device comprising an elongate fastening element, a rotatable tightening element and a sleeve for said fastening element, said tightening element comprising at least one arcuate camming surface engageable with a head portion of said fastening element such that rotation of said tightening element about an axis of rotation thereof pulls said fastening element generally towards said axis of rotation, said sleeve (i) being adapted such that, in use, a leading end portion thereof remains in a fixed position relative to said axis of rotation, (ii) having an opposite end portion adapted to be radially expandable by said fastening element when so pulled for fixing said fastening element to one such joint member and (iii) being partially collapsible in the lengthwise direction thereof.

2. A device as claimed in claim 1, wherein said sleeve comprises a wall provided with collapsing means whereby the sleeve is partially collapsible in the lengthwise direction thereof.

3. A device as claimed in claim 2, wherein said collapsing means defines a plurality of collapsible zones at spaced apart locations along the length of the sleeve.

4. A device as claimed in claim 2 or 3, wherein said collapsing means comprises at least one portion of reduced thickness defined in said wall.

5. A device as claimed in claim 4, wherein the at least one said portion of reduced thickness defines a groove extending in said lengthwise direction.

6. A device as claimed in any one of claim 4, wherein said collapsing means comprises at least one aperture defined in said wall.

7. A device as claimed in claim 6, wherein the at least one said aperture extends between said leading end portion and the other end portion of the sleeve.

8. A device as claimed in claim 6, wherein the at least one said aperture is a cruciate aperture.

9. A device as claimed in any of claims 1, 2 or 3 wherein the leading end portion of the sleeve remains in said fixed position by virtue of its being arranged to engage a peripheral surface of the tightening element.

10. A device as claimed in claim 9, wherein said peripheral surface of the tightening element is disposed at a substantially constant radial distance from said axis of rotation thereof.

11. A device as claimed in claim 1, wherein the tightening element comprises a body which has an axis of rotation and defines a generally centrally disposed cavity for receiving said head portion of the fastening element, an opening through which said head portion can be inserted into said cavity and a slot extending from said opening about said body for receiving a neck portion of the fastening element when, in use, the tightening element is rotated in one direction about said axis of rotation with said head portion received in the cavity, the slot being adapted to permit rotation of the tightening element in said one direction through an angle of at least 190 degrees.

12. A device as claimed in claim 11, wherein said slot is adapted to permit said rotation in said one direction through a maximum angle in the range 190 to 225 degrees.

13. A device as claimed in claim 11 or 12, wherein the profile of the camming surface is such that the relation between the amount of said axial movement of the tightening element and the amount of rotation of the fastening element in said one direction is substantially constant over at least 75 percent of the range of said axial movement.

14. A device as claimed in claim 13, wherein said camming surface profile is adapted to cause less than 100.3 mm said axial movement for each 10 degrees of rotation of the tightening element in said one direction.

15. A device as claimed in claim 14, wherein said camming surface profile is adapted to cause approximately 0.25 mm said axial movement for each 10 degrees of rotation of the fastening element in said one direction.

16. A device as claimed in claim 13, wherein the relation between the amount of said axial movement of the fastening element and the amount of rotation of the tightening element in said one direction is substantially constant substantially throughout the range of said axial movement.

17. A device as claimed in claim 11 or 12, wherein in directions transverse the arcuate length thereof, each camming surface is concave.

18. A device as claimed in claim 11, wherein said body is generally cylindrical.

19. A device as claimed in claim 18, wherein said body comprises a first cylindrical portion and a second cylindrical portion interconnected by web means.

20. A device as claimed in claim 19, wherein said web means comprises a generally U-shaped section.

21. A device as claimed in claim 19, wherein said web means defines the limit of said rotation in said one direction.

22. A device as claimed in claim 19, wherein the or at least one said camming surface is defined by a rib projecting from one of said cylindrical portions.

23. A device as claimed in claim 18, wherein said body has a diameter of approximately 15 mm or less.

24. A device as claimed in claim 17, wherein said tightening element comprises formations adapted to cooperate with said head portion of the fastening element for facilitating interlocking engagement therewith.

25. A device as claimed in claim 24, wherein said formations comprise a plurality of depressions disposed in one said tightening element.

26. A device as claimed in claim 17, wherein said head portion of the fastening element defines a convex engaging surface for engaging each said camming surface.

\* \* \* \* \*